(12) United States Patent
Muramatsu et al.

(10) Patent No.: US 6,352,249 B2
(45) Date of Patent: Mar. 5, 2002

(54) FLUID-FILLED VIBRATION DAMPING DEVICE HAVING PNEUMATICALLY OSCILLATED CYLINDRICAL MEMBER

(75) Inventors: Atsushi Muramatsu, Komaki; Hiroyuki Ichikawa, Kani, both of (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/820,447

(22) Filed: Mar. 28, 2001

(30) Foreign Application Priority Data

Mar. 30, 2000 (JP) ......... 2000-94916
Aug. 24, 2000 (JP) ......... 2000-253274

(51) Int. Cl.$^7$ ................. F16F 5/00
(52) U.S. Cl. .............. 267/140.14; 267/140.15
(58) Field of Search .......... 267/140.11–140.15, 267/219; 248/562, 566

(56) References Cited

U.S. PATENT DOCUMENTS

| | | | |
|---|---|---|---|
| 4,693,455 A | | 9/1987 | Andrä |
| 5,170,998 A | * | 12/1992 | Muramatsu ........... 267/140.13 |
| 5,205,546 A | * | 4/1993 | Schisler et al. ........ 267/140.13 |
| 5,246,212 A | * | 9/1993 | Funahashi et al. ..... 267/140.13 |
| 5,267,726 A | * | 12/1993 | Takeo et al. .......... 267/140.14 |
| 5,314,173 A | * | 5/1994 | Ide et al. ............. 267/140.14 |
| 5,386,977 A | * | 2/1995 | Quast ................ 267/140.13 |
| 5,769,402 A | * | 6/1998 | Ide et al. ............. 267/140.14 |
| 5,992,833 A | | 11/1999 | Tanahashi |
| 6,017,024 A | | 1/2000 | Muramatsu et al. |
| 6,082,717 A | | 7/2000 | Nanno |
| 6,120,212 A | | 9/2000 | Shibata et al. |

FOREIGN PATENT DOCUMENTS

| | | |
|---|---|---|
| JP | 10-184770 | 7/1998 |

* cited by examiner

*Primary Examiner*—Christopher P. Schwartz
(74) *Attorney, Agent, or Firm*—Beyer Weaver & Thomas, LLP

(57) ABSTRACT

A fluid-filled vibration damping device includes an elastic body connecting two mutually spaced-apart first and second mounting members and partially defining a primary fluid chamber filled with a non-compressible fluid, a flexible diaphragm partially defining an auxiliary fluid chamber whose volume is variable, a first partition wall fixed to the second mounting member so as to define one side thereof the primary fluid chamber and the other side there of the auxiliary fluid chamber, a first orifice passage formed at a central portion of the first partition wall for fluid communication between the two chambers, and an annular or cylindrical elastic oscillating plate disposed radially outwardly of the orifice passage so as to continuously extend in its circumferential direction while partially defining the pressure receiving chamber on one side thereof and an oscillating air chamber on the other side thereof. The elastic oscillating plate is oscillated to cause a periodic change of the fluid in the pressure-receiving chamber, by a periodic change of an air pressure which is applied to the oscillating air chamber, whereby the vibration-damping device exhibits an active damping effect with respect to the vibrations to be damped.

17 Claims, 3 Drawing Sheets

FLUID-FILLED VIBRATION DAMPING DEVICE HAVING PNEUMATICALLY OSCILLATED CYLINDRICAL MEMBER

INCORPORATION BY REFERENCE

The disclosure of Japanese Patent Application Nos. 2000-94916 and 2000-253274 filed on Mar. 30, 2000 and Aug. 24, 2000, respectively, are incorporated herein by reference.

BACKGROUND OF THE INVENTION

1. Field of the Invention

The present invention relates generally to a fluid-filled vibration-damping device which has a fluid chamber or chambers filled with a non-compressible fluid. More particularly, the present invention is concerned with a pneumatically operated fluid-filled vibration-damping device which includes a fluid chamber partially defined by one of opposite surfaces of an elastic oscillating plate and an oscillating air chamber partially defined by the other surface of the elastic oscillating plate, and which is operable by applying a suitable air pressure change to the oscillating air chamber so that the vibration damping device exhibits desirably controlled damping characteristics thereof.

2. Description of the Related Art

As one type of a vibration damper such as a vibration damping bushing or a vibration damping mount, for flexibly connecting two members in a vibration system or mounting one of the two members on the other member in a vibration damping fashion, there is known a pneumatically operated fluid-filled vibration damping device, as disclosed in Japanese Laid-Open Publication No. JP-A-10-184770. Such a known pneumatically operated fluid-filled vibration damping device includes: a first and a second mounting members, which are spaced apart from each other; an elastic body elastically connecting the first and second mounting members and partially defining a primary fluid chamber filled with a non-compressible fluid; a flexible diaphragm partially defining an auxiliary fluid chamber filled with the non-compressible fluid and having a variable volume; a partition member fixed to the second mounting member such that the primary fluid chamber is disposed on one of opposite sides of the partition member and the auxiliary fluid chamber is disposed on the other side of the partition member; means for defining a first orifice passage for fluid communication between the primary and auxiliary fluid chambers; and an elastic oscillating plate partially defining on one of opposite sides thereof the pressure receiving chamber and on the other side thereof an oscillating air chamber, to which a suitably controlled periodic change of an air pressure is applied to the oscillating air chamber so that the elastic oscillating plate is oscillated by an oscillating force having a frequency corresponding to the frequency of the vibration to be damped. This type of the vibration-damping device is capable of controlling its vibration damping characteristics by adjusting the frequency or other factors of the periodic change of the air pressure applied to the oscillating air chamber. Therefore, this type of the vibration damping device has been suitably applied to vibration dampers such as an engine mount, which require to damp input vibrations whose frequencies and other factors are variable.

As is understood from the above-indicated publication, the known vibration damping device uses a disk-like shaped rubber elastic plate as the elastic oscillating plate which is oscillated to transmit the oscillating force caused by the periodic change of the air pressure in the oscillating air chamber to the primary fluid chamber to cause a pressure change of the fluid in the primary fluid chamber. The rubber elastic plate is fixedly supported at its peripheral portion by a member on the side of the second mounting member, and the first orifice member is disposed radially outwardly of the rubber plate for fluid communication between the primary and auxiliary fluid chambers.

In the known vibration damping device, the rubber elastic plate is desirably required to have a relatively large area so that the vibration damping device exhibits a high damping effect even in the case where the vibration to be damped has a relatively large vibrational energy.

However, the known vibration damping device constructed as described above needs to leave a space for disposing the first orifice passage at the radially outward portion of the rubber elastic plate, making it difficult to increase a diameter of the rubber elastic plate, resulting in difficulty in obtaining a sufficiently large area of the elastic rubber plate within a limited tolerable range of the outer diameter of the vibration damper.

Moreover, the rubber elastic plate whose diameter is increased to provide a sufficiently large area thereof is prone to be oscillated with a relatively large amplitude at its central portion. This may cause interference between the rubber elastic plate and other members incorporated within the vibration damper, resulting in deterioration of damping capacity of the device, generation of noises, and undesirable damages of the rubber elastic plate and the other members. In order to avoid the above-indicated interference between the rubber elastic plate and the other incorporated members, the vibration-damping device is inevitably made large in size.

SUMMARY OF THE INVENTION

It is therefore an object of this invention to provide a pneumatically operated fluid-filled vibration damping device which has a novel structure suitable for obtaining a sufficiently large area of an elastic oscillating plate while limiting the size of the device, and suitable for limiting an amount of maximum displacement of the elastic oscillating plate upon oscillation thereof.

The above and other objects of this invention may be attained according to the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) A fluid-filled vibration damping device comprising: a first and a second mounting member which are spaced apart from each other; an elastic body elastically connecting the first and second mounting members and partially defining a primary fluid chamber filled with a non-compressible fluid; a flexible diaphragm partially defining an auxiliary fluid chamber filled with the non-compressible fluid and whose volume is variable; a first partition wall fixed to the second mounting member and partially defining the primary fluid chamber on one of opposite sides thereof and the auxiliary fluid chamber on the other side thereof; a first orifice passage formed at a central portion of the first partition wall for fluid communication between the primary and auxiliary fluid chamber; and an elastic oscillating plate having an annular or a cylindrical shape and disposed radially outwardly of the orifice passage so as to continuously extend in a circumferential direction thereof, the elastic oscillating plate partially defining the primary fluid chamber on one of opposite sides thereof and an oscillating air chamber on the other side thereof, the oscillating air chamber being applied with a periodic change of an air pressure so as to apply to the elastic oscillating plate an oscillating force whose frequency is corresponding to that of vibrations to be damped, whereby the vibration damping device exhibits an active damping effect with respect to the vibrations to be damped.

In the fluid-filled vibration damping device constructed according to the present mode of the invention, the first orifice passage is formed in the central portion of the first partition wall and the annular or cylindrical elastic oscillating plate is disposed radially outwardly of the first orifice passage, making it possible to increase a diameter of the elastic oscillating plate, without taking into account the provision of the first orifice passage. Since the elastic oscillating plate with the increased diameter has a large circumferential length at its outer circumferential portion, the elastic oscillating plate can provide the sufficiently large area thereof at its outer circumferential portion. Thus, the arrangement of this mode (1) assures a sufficiently large area of the elastic oscillating plate without an increase of an external dimension of the device, thereby permitting a sufficient amount of change in a fluid pressure in the primary fluid chamber. Thus, the fluid-filled vibration damping device can exhibits an active vibration damping effect even to input vibrations having a relatively large amplitudes.

In addition, the use of the elastic oscillating plate having the annular or cylindrical shape, prevents the elastic oscillating plate to have an excessively large free length thereof, i.e., a distance between the fixing portions of the elastic oscillating plate to the other components of the device, thereby restricting the maximum displacement of the oscillating plate upon oscillation thereof caused by the periodic change of the air pressure applied to the oscillating air chamber. That is, the use of the annular or cylindrical elastic oscillating plate is effective to avoid the increase of the external dimension of the device with high efficiency, and to prevent the interference of the elastic oscillating plate with the other elements incorporated within the device.

(2) A fluid-filled vibration damping device according to the above mode (1), wherein the second mounting member includes a cylindrical wall portion one of axially opposite open ends of which is opposed to the first mounting member with a spacing therebetween, the elastic body elastically connects the first mounting member with the one of axially opposite open ends of the cylindrical wall portion of the second mounting member such that the one of axially opposite open ends of the cylindrical wall portion of the second mounting member is fluid-tightly closed by the elastic body, the flexible diaphragm fluid tightly closes the other open end of the cylindrical wall portion of the second mounting member, and the first partition wall is supported by and disposed within the cylindrical wall portion of the second mounting member and cooperates with the flexible diaphragm to define therebetween the auxiliary fluid chamber, the vibration damping device further comprising a central tube member fixedly disposed through the first partition wall so as to extend straightly substantially in a center axis of the first partition wall over the primary and auxiliary fluid chambers, the central tube member having a bore serving as the first orifice passage, the elastic oscillating plate having a generally annular shape and being fixedly supported at an inner peripheral portion thereof by the central tube member onto which the inner peripheral portion of the elastic oscillating plate is press-fitted, and while being fixedly supported at an outer peripheral portion thereof by the cylindrical wall portion of the second mounting member, the elastic oscillating plate and the first partition wall being opposed to each other with a spacing therebetween to define therebetween the oscillating air chamber.

In this mode (2), the cylindrical portion of the second mounting member is effectively utilized to accommodate components of the device. Namely, the components of the device is effectively arranged within the cylindrical portion of the second mounting member, making it possible to form the primary fluid chamber, the oscillating air chamber and the auxiliary fluid chamber with a simple structure. The second mounting member may be constituted by a hollow cylindrical member which is open at its axially opposite end faces, or alternatively by a cup shaped member which is open only in its one axial end which is opposed to the first mounting member. The second mounting member may otherwise have a split structure consisting of a plurality of cylindrical members which are superposed on each other in their axial direction and fixed together at their abutting portions by calking. In this case, the elastic oscillating plate and the partition wall may be fixed to the second mounting member such that the outer peripheral portions of the elastic oscillating plate and the partition wall are griped by and compressed between the abutting portions of the cylindrical members.

Further, the elastic oscillating plate is fixedly supported at its central portion by the central tube member which is disposed substantially coaxially with the first partition wall so as to extend straightly in the center axis of the first partition wall, while being fixedly supported at its outer peripheral portion by the second mounting member. In this arrangement, the inner diameter of the elastic oscillating plate is desirably made smaller, since the central tube member serving as the first orifice passage is a straight tube member, while the outer diameter of the elastic oscillating plate is desirably made larger, since the outer diameter is dimensioned without being limited by the provision of the first orifice passage, making it possible to obtain the effective area of the elastic oscillating plate with further improved efficiency. Since the central portion of the elastic oscillating plate is fixedly supported by the central tube member, the free length of the elastic oscillating plate is effectively restricted, thereby limiting the maximum amount or amplitude of elastic deformation of the elastic oscillating plate, minimizing a required space for accommodating the elastic oscillating plate and reducing an overall size of the vibration damping device. Further, the minimized amount of displacement of the elastic oscillating plate permits an improved oscillation responsibility of the elastic oscillation plate upon oscillation of the elastic oscillation plate at medium- and high-frequency bands, resulting in improved active damping effect of the vibration damping device with respect to medium and high frequency vibrations.

The first and second mounting members may preferably be formed of rigid materials such as metal. For effective damping of input vibrations based on resonance of the non-compressible fluid flowing through the first orifice passage, it is preferable to use the non-compressible fluid whose viscosity is not higher than 0.1 Pa.s. The elastic oscillating plate is required to be impermeable with respect to the non-compressible fluid and to be deformable by the periodic change of the air pressure in the oscillating air chamber. Preferably, a rubber elastic layer may be used as the elastic oscillating layer. Alternatively, a synthetic resin layer, a metallic leaf spring, or the like may also be employed as the elastic oscillating plate. The periodic change of the air pressure in the oscillating air chamber may be caused between two different negative values, between two different positive values or between negative and positive values, or alternatively between the atmospheric pressure and a predetermined negative or positive value. Where the present vibration-damping device is used for a motor vehicle having an internal combustion engine, the negative pressure for the damping device is readily available from the engine. Accordingly, the oscillating air chamber is alternately connected to the negative source of the engine and the atmosphere via a valve, whereby the periodic change of the air pressure in the oscillating air chamber may be caused, for example. The central tube member serving as the first orifice passage is preferably formed of a rigid material so as to keep the shape of the orifice passage constant. A cylindrical member made of metal or a synthetic resin material is desirably employed as the tube member, in the light of its efficiency in manufacture. The method or structure for fluid-tightly fixing the inner and outer peripheral portions of the elastic oscillating plate to the sides of the cylindrical tube member and the second mounting member, is not particularly limited, but may be selected from bonding, clamping or press fitting, for example. Preferably, the outer circumferential surface of the elastic oscillating plate is fluid-tightly fixed to the cylindrical portion of the second mounting member by calking.

(3) A fluid-filled vibration damping device according to the above mode (2), wherein the elastic oscillating plate has a tapered cylindrical shape and disposed radially outwardly of the central tube member so that the elastic oscillating plate cooperate with the first partition wall to define therebetween an annular void disposed radially outwardly of the central tube member and extending in a circumferential direction thereof while being open in a circumferential surface thereof, the opening of the annular void being fluid-tightly closed by the cylindrical wall portion of the second mounting member, to thereby define the oscillating air chamber interposed between the elastic oscillating plate and the first partition wall.

In this mode (3), the elastic oscillating plate is arranged to have the tapered cylindrical shape, permitting to effectively provide a relatively large area of the elastic oscillating plate, without an increase of the outer diameter of the elastic oscillating plate, in comparison with the case where a plane annular elastic oscillating plate is used. Meanwhile, an air inlet port for introducing a pressured air into the oscillating air chamber may be formed through the cylindrical wall portion of the second mounting member.

(4) A fluid-filled vibration damping device according to claim 1, wherein the second mounting member includes a cylindrical wall portion one of axially opposite open ends of which is opposed to the first mounting member with a spacing therebetween, the elastic body elastically connects the first mounting member with the one of axially opposite open ends of the cylindrical wall portion of the second mounting member such that the one of axially opposite open ends of the cylindrical wall portion of the second mounting member is fluid-tightly closed by the elastic body, the flexible diaphragm fluid tightly closed the other open end of the cylindrical wall portion of the second mounting member, and the first partition wall is supported by and disposed within the cylindrical wall portion of the second mounting member, the first partition wall partially defining the primary fluid chamber on one of opposite side thereof and the auxiliary fluid chamber on the other side thereof, the elastic oscillating plate having a generally cylindrical shape and disposed within the primary fluid chamber such that axially opposite end portions of the elastic oscillating plate are supported by respective axial portions of the cylindrical wall portion of the second mounting member, the elastic oscillating plate partially defining the primary fluid chamber on an inner circumferential side thereof and cooperating with the cylindrical wall portion of the second mounting member to define therebetween the oscillating air chamber on an outer circumferential side thereof.

In this mode (4), the elastic oscillating plate has a cylindrical shape and is disposed in the outer circumferential portion of the vibration-damping device. Therefore, the elastic oscillating plate may be formed with a relatively large circumferential length, permitting an increase of the area of the elastic oscillating plate, while avoiding undesirable increase of the external dimensions of the vibration-damping device. The use of the cylindrical elastic oscillating plate makes it possible to obtain a sufficiently large area of the elastic oscillating plate and to provide a relatively large space in a radially inward portion of the elastic oscillating plate. The large space in the elastic oscillating plate permits to provide the first orifice passage with a relatively large cross sectional area or a relatively large length, leading to a high degree of freedom in tuning the first orifice passage, and a resultant high degree of freedom in tuning the damping characteristics of the vibration damping device.

(5) A fluid-filled vibration damping device according to the above mode (4), wherein the first orifice passage extends annularly or helically in the circumferential direction of the first partition wall. In this mode (5) the length of the first orifice passage is made larger, leading to an increase in an amount of flow of the fluid through the first orifice passage, whereby the vibration damping device can exhibit an improved damping effect based on flows of the fluid through the first orifice passage. In particular, the combination use of the annularly or helically extending first orifice passage and the cylindrical elastic oscillating plate makes it possible to provide a space large enough to form the first orifice passage in the radially inner portion of the elastic oscillating plate, without increasing the external dimension of the vibration damping device, and without limiting the size of the area of the elastic oscillating plate. Thus, the first orifice passage can be formed with the relatively large length.

(6) A fluid-filled vibration damping device according to any one of the above-indicated modes (1)–(5), the further comprising a second partition wall fixed to and supported by the second mounting member, such that the second partition member divides the primary fluid chamber into a pressure receiving chamber partially defined by the elastic body and filled with the non-compressible fluid a pressure of which changes due to an elastic deformation of the elastic body, and an oscillating fluid chamber partially defined by the elastic oscillating plate and filled with the non-compressible fluid a pressure of which changes due to displacement of the elastic oscillating plate, and a second orifice passage for fluid communication between the pressure receiving chamber and the oscillating fluid chamber.

In the vibration-damping device constructed according to the mode (6) of the invention, the pressure change of the fluid filling the oscillating fluid chamber is induced by the displacement of the elastic oscillating plate, and is transmitted to the pressure receiving chamber via the second orifice passage. Based on resonance of the fluid flowing through the second orifice passage, the pressure change of the fluid in the oscillating fluid chamber is effectively transmitted to the pressure receiving chamber with high efficiency, thereby generating a relatively large oscillating force with an improved energy efficiency. The structure or shape of the second orifice passage is not particularly limited, but may be suitably determined, taking into consideration required vibration damping characteristics of the device. For instance, the second orifice passage may be constituted by a single fluid passage continuously extending, or alternatively by a plurality of through hole each extending through the wall thickness of the second partition wall.

(7) A fluid-filled vibration damping device according to the above indicated mode (6), wherein the first and second partition walls are superposed on each other and cooperate to define at central portion thereof the first orifice passage. In this mode (7) of the invention, the first orifice passage is formed by utilizing the first and second partition walls with high efficiency, leading to an increased high degree of freedom in designing the shape and structure of the first orifice passage and in tuning the first orifice passage, and leading to a reduced number of the required components for forming the first orifice passage.

(8) A fluid-filled vibration damping device according to the above-indicated mode (6) or (7), wherein the elastic oscillating plate has an annular plate-like shape and is interposed between outer circumferential portions of the first and second partition walls which are superposed on each other, the elastic oscillating plate cooperating with the first partition plate to define therebetween the oscillating air chamber, while cooperating with the second partition plate to define therebetween the oscillating fluid chamber.

In the vibration-damping device according to this mode (8) of the invention, the first and second partition walls are superposed on each other to define therebetween a spacing which is effectively utilized to form the oscillating fluid and air chambers, resulting in a reduced number of the required components for forming the oscillating fluid and air chambers. Further, the central portions of the first and second partition walls are effectively utilized to form the first orifice passage.

(9) A fluid-filled vibration damping device according to any one of the above-indicated modes (6)–(8), wherein the first orifice passage is formed through the first and second partition wall such that the first orifice passage extends straightly in the center axes of the first and second partition walls, and the second orifice passage is disposed radially outwardly of the first orifice passage so as to extend in a circumferential direction.

According to the vibration damping device of this mode (9) of the invention, the length of the second orifice passage can be made larger, while holding the overall size of the device in compact, leading to a higher degree of freedom in tuning the second orifice passage. The arrangement of this mode (9) facilitates to form the first and second orifice passages independent from each other, such that the first and second orifice passages have respective cross sectional areas or lengths, resulting in high facility in tuning the first and second orifice passages independently of each other.

(10) A fluid-filled vibration damping device according to any one of the above-indicated modes (6)–(8), wherein the second orifice passage is formed in a radially intermediate portion of the second partition wall so as to extend in a circumferential direction of the second partition wall, one of opposite ends of the second orifice passage, which end is connected to the oscillating fluid chamber, further extends so as to be connected with the auxiliary fluid chamber, so that the first orifice passage is formed by partially utilizing the second orifice passage.

In the vibration-damping device of the mode (10) of the invention, the first and second orifice passages are connected in series with each other, making it possible to reduce a space required for forming the first and second orifice passages, in comparison with the case where the first and second orifice passage are formed independently of each other. Further, the first orifice passage is partially defined by utilizing the second orifice passage, assuring a sufficiently large length of the first orifice passage with high efficiency.

(11) A fluid-filled vibration damping device according to any one of the above-indicated modes (1)–(10), wherein the vibration damping device elastically connects the two members of the vibration system, or elastically mount one of the two members on the other members such that the first mounting member is fixed to one of the two members in the vibration system, while the second mounting member is fixed to the other member in the vibration system.

According to this mode (11) of the invention, the vibration-damping device is suitably utilized as a vibration damping mount or suspension busing for automotive vehicles, such as an engine mount, a body mount, and a cab mount.

(12) A fluid-filled vibration damping device according to any one of the above-indicated modes (1)–(11), wherein one of the first and second mounting members is fixed to a vibrative member whose vibration to be damped, and the other of the first and second mounting members is connected to the vibrative member via the elastic body, the other of the first and second mounting members cooperating with the elastic body to constitute a secondary vibration system.

According to this mode (12) of the invention, the vibration-damping device is suitably utilized as a dynamic damper or a vibration damper (or oscillator) fixed to a specific portion such as a floor of an automotive vehicle, for example.

BRIEF DESCRIPTION OF THE DRAWINGS

The above and other objects, features advantages and technical and industrial significance of the present invention will be better understood by reading the following detailed description of the present preferred embodiments or modes of the invention when considered in conjunction with the accompanying drawings in which.

DETAILED DESCRIPTION OF THE PREFERRED EMBODIMENT

Figure 1:
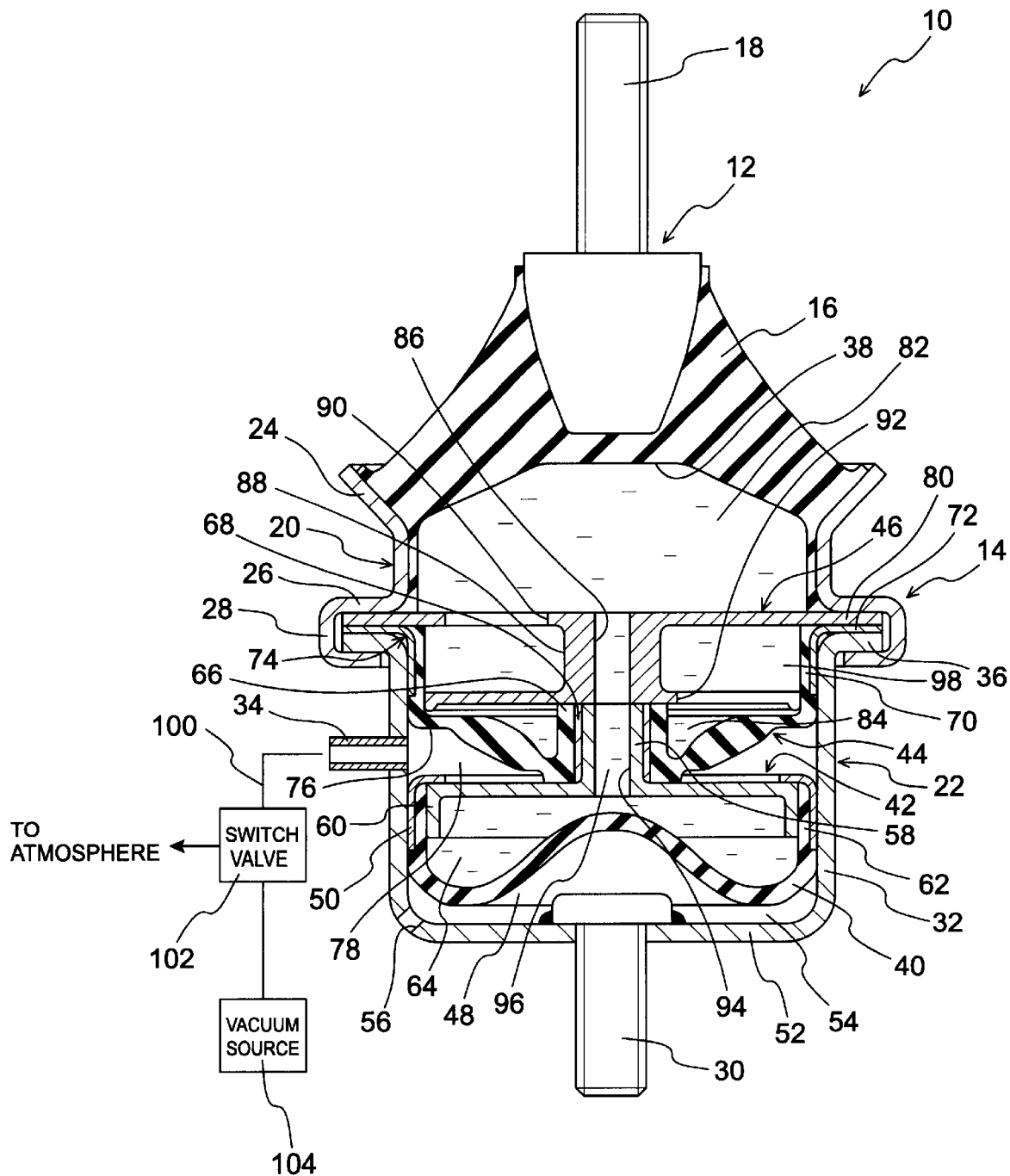
FIG. 1 is an elevational view in axial or vertical cross section of a fluid-filled vibration-damping device in the form of an engine mount constructed according to a first embodiment of this invention.

Referring first to FIG. 1, there is shown an engine mount for an automotive vehicle, as a first embodiment of the fluid-filled vibration-damping device of the present invention. This engine mount includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material. The first and second mounting members 12, 14 are attached to a power unit and a body of the vehicle, respectively, so that the power unit is mounted on the vehicle body in a vibration damping or isolating fashion. In the following description, the words "upper" and "lower" or "upward" and "downward" will be used to represent vertically upper and lower positions or directions of the components or parts in the engine mount 10 as viewed in FIG. 1.

The first mounting member 12 includes a body portion having an inverted generally frusto-conical shape, and a first mounting bolt 18 which is fixedly formed at and extends axially upwardly from a large-diameter end face of the body portion of the first mounting member 12.

The second mounting member 14 is constituted by a cylindrical member 20 and a bottom member 22 which are both made of metallic materials. The cylindrical member 22 has a generally hollow cylindrical shape with a relatively large diameter, and includes a tapered portion 24 integrally formed at its axially upper open-end portion, and a shoulder portion 26 and a calking portion 28 both integrally formed at its axially lower open-end portion, as seen in FIG. 1. The tapered portion 24 extends radially outwardly in the axially outward direction. The shoulder portion 26 has a generally annular shape and extends in a radially outward direction. The calking portion 28 has a cylindrical shape and extends axially outwardly (i.e., downwardly as seen in FIG. 1) from the outer peripheral portion of the shoulder portion 26.

The bottom member 22 is a generally cylindrical member having a cylindrical wall 32 and a bottom wall 52, and includes a second mounting bolt 30 which is fixed by welding to the central portion of the bottom wall 52 so as to extend axially downwardly from the bottom wall 52. A port 34 in the form of a cylindrical tube is fixed to a circumferential portion of an axially intermediate portion of the cylindrical wall 32 of the bottom member 22 so as to extend through the wall thickness of the cylindrical wall 32 and so as to extend radially outwardly from the outer circumferential surface of the bottom member 22. The bottom member 22 further includes an outward flange 36 integrally formed at and extends radially outwardly from its axially upper open-end.

The cylindrical member 20 and the bottom member 22 are disposed in a concentric or coaxial relationship with each other, and are assembled with each other such that the shoulder portion 26 of the cylindrical member 20 is superposed on the outward flange 36 of the bottom member 22, and then the outward flange 36 is calked to the calking portion 28 of the cylindrical member 20. The thus fixedly assembled cylindrical and bottom members 20, 22 cooperate to provide the second mounting member 14 having a generally cup-shape with a relatively large axial length. It is noted that the cylindrical member 20 and the cylindrical wall 32 of the bottom member 22 cooperate to serve as a cylindrical wall portion of the second mounting member 14, in the present embodiment.

The elastic body 16 has a generally frusto-conical shape and is bonded at its small diameter end portion to the first mounting member 12, upon vulcanization of a rubber material for forming the elastic body 16, such that the body portion of the first mounting member 12 is embedded in the small diameter end portion of the elastic body 16. The elastic body 16 is also bonded at an outer circumferential surface of its large diameter end portion to the inner circumferential surface of the tapered portion 24 of the cylindrical member 24, in the above-indicated process of vulcanization. Thus, an integral vulcanized assembly consisting of the first mounting member 12, the cylindrical member 20 and the elastic body 16 is formed. The elastic body 16 has a large-diameter recess 38 open in its large-diameter end face, so that a tensile stress acting on the elastic body 16 upon installation of the engine mount 10 in position is reduced or prevented.

With the elastic body 16 bonded by vulcanization to the cylindrical member 20 as described above, the opening of the second mounting member 14 is fluid-tightly closed by the elastic body 16. Within the fluid-tightly closed second mounting member 14, there are disposed a flexible diaphragm 40, a first partition wall in the form of a metallic partition member 42, an elastic oscillating plate in the form of an oscillating rubber plate 44, and a second partition wall in the form of a metallic separation-wall member 46, which are superposed on one another in this order. In this embodiment, the partition member 42 and the separation-wall member 46 constitute a partition structure.

The flexible diaphragm 40 is a thin rubber layer which is easily deformable and has a shallow bowl-like shape. The flexible diaphragm 40 has a slack at its central portion so as to facilitate its deformation. The flexible diaphragm 40 is bonded at its peripheral portion to a cylindrical press-fitting member 50 upon vulcanization of a rubber material for forming the flexible diaphragm 40. The press-fitting member 50 is press-fitted into an axially lower portion of the cylindrical wall 32 of the bottom member 22 so that the flexible diaphragm 40 is located in the vicinity of the bottom portion 48 of the bottom member 22. That is, the flexible diaphragm 40 is fluid-tightly fixed at its peripheral portion to the second mounting member 14 such that the flexible diaphragm 40 divides the interior space of the second mounting member 14 into two section formed on both sides thereof, namely an air chamber 54 defined by and between the flexible diaphragm 40 and the bottom wall 52 of the second mounting member 14 and a fluid chamber partially defined by and between the flexible diaphragm 40 and the elastic body 16. The provision of the air chamber 54 permits a free deformation of the flexible diaphragm 40. While it may be possible to fluid-tightly close the air chamber 54, the air chamber 54 is open to the atmosphere through a communication hole 56 formed through the bottom wall 52 in the present embodiment.

The partition member 42 is a generally disk-shaped member including a central tube member in the form of a cylindrical portion 58 which is integrally formed at a central portion of the partition member 42 so as to extend axially upwardly. The partition member 42 further includes an annular fixing portion 60 integrally formed at an outer peripheral portion thereof so as to extend axially downwardly. The thus constructed partition member 42 is fixed to the second mounting member 14 such that the fixing portion 60 of the partition member 42 is forcedly fitted into the inner circumferential surface of the cylindrical wall 32 of the second mounting member 14 via a sealing rubber layer 62 formed by the peripheral portion of the diaphragm 40 compressively interposed therebetween. In other words, the press-fitting member 50 is press-fitted onto the outer circumferential surface of the fixing portion 60 via the sealing rubber layer 62 compressed therebetween, by drawing or calking. With the partition member 42 assembled in the second mounting member 14 as described above, the cylindrical portion 58 of the partition member 42 is located in a coaxial relationship with the second mounting member 14 so as to extend in the axially upward direction as seen in FIG. 1, and the opening of the flexible diaphragm 40 is fluid-tightly closed by the partition member 42. In this condition, the flexible diaphragm 40 and the partition member 42 cooperate to define therebetween an auxiliary fluid chamber in the form of an equilibrium chamber 64 whose volume is variable with ease due to the deformation of the flexible diaphragm 40.

The oscillating rubber plate 44 is a tapered cylindrical or a funnel-like shaped member and interposed between the partition and separation-wall partition members 42, 46 such that the small diameter portion of the oscillating rubber plate 44 is disposed axially downward of the large diameter portion of the oscillating rubber plate 44. The oscillating rubber plate 44 further includes a small-diameter boss portion 66 integrally formed at its small diameter portion so as to extend axially upwardly from the small diameter portion. The boss portion 66 is bonded at its inner circumferential surface thereof to a cylindrical fixing sleeve 68, upon vulcanization of a rubber material to form the oscillating rubber plate 44. The oscillating rubber plate 44 yet further includes a cylindrical support portion 70 integrally formed with the large diameter end portion of the oscillating rubber plate 44. The cylindrical support portion 70 is bonded at its outer circumferential surface to an inner circumferential surface of a metallic support sleeve 74 in the above-indicated vulcanization process. The metallic support sleeve 74 includes an outward flange 72 extending radially outwardly from the axially upper end face thereof.

The fixing sleeve 68 is press-fitted onto the cylindrical portion 58 of the partition member 42, while the metallic support sleeve 74 is inserted into the open-end portion of the lower member 22 and is calked at its outward flange 72 to the calking portion 28 of the cylindrical member 20. In this condition, the oscillating rubber plate 44 is fixedly accommodated within the second mounting member 14 such that the inner and outer peripheral portions of the cylindrical member 20 is fixedly located at respective portions on the side of the second mounting member 14. In addition, the oscillating rubber plate 44 is closely fixed at its inner circumferential portion to the partition member 42, while being spaced apart from the partition member 42 in the axially upward direction as the diameter of the oscillating rubber plate 44 increases, whereby the oscillating rubber plate 44 and the partition member 42 cooperate to define therebetween an annular pocket 76 (such as an annular void) which is open in the outer circumferential surface of the partition member 42 and the oscillating rubber plate 44. The opening of the pocket 76 is fluid-tightly closed by the cylindrical wall 32 of the second mounting member 14, to thereby form an oscillating air chamber 78 which is connectable to external air sources through the port 34 formed through the cylindrical wall 32 of the bottom member 22.

The separation-wall member 46 is a thick walled disk-shaped member including an outward flange 80 integrally formed at a peripheral portion of its axially upper end face. The separation-wall member 46 is fixed to the second mounting member 14 such that the outward flange 80 is calked together with the outward flange 72 of the support sleeve 74 to the calking portion 28 of the cylindrical member 20. Thus, the separation-wall member 46 divides the fluid-tight space of the second mounting member 14 into two sections formed on axially opposite sides thereof, namely a pressure receiving chamber 82 partially defined by the elastic body 16 whose pressure is changed due to the elastic deformation of the elastic body 16 upon application of vibrational loads, and a fluid oscillating chamber 84 partially defined by the oscillating rubber plate 44 whose pressure is changed due to the oscillating displacement of the oscillating rubber plate 44.

The separation-wall member 46 includes a through hole 86 formed through a central portion thereof so as to open in its axially opposite end faces, and an annular groove 88 open in its outer circumferential surface and extending in its circumferential direction with a circumferential length slightly smaller than its circumference. The separation-wall member 46 also includes a first window 90 open in its axially upper end face and a second window 92 open in its axially lower end face. One of opposite ends of the annular groove 88 is open in the axially upper end face of the separation-wall member 46 through the first window 90, while the other end of the annular groove 88 is open in the axially lower end face of the separation-wall member 46 through the second window 92. With the axially lower end face of the separation-wall member 46 held in close contact with the axially upper end face of the cylindrical portion 58 of the first partition member 42, a bore 94 of the cylindrical portion 58 and the through hole 86 are connected with each other and cooperate to define a first orifice passage 96, which extends straightly along with a center axis of the second mounting member 14 with a substantially constant cross sectional shape, for fluid communication between the pressure receiving chamber 82 and the equilibrium chamber 64. On the other hand, the opening of the annular groove 88 is fluid-tightly closed by the cylindrical support portion 70 fitted onto the outer circumferential surface of the separation-wall member 46, thereby providing a second orifice passage 98 for fluid communication between the pressure receiving chamber 82 and the oscillating fluid chamber 84.

The pressure receiving chamber 82, the fluid-oscillating chamber 84, and the equilibrium chamber 64, which are all formed within the fluid-tight space of the second mounting member 14, are filled with a suitable non-compressible fluid such as water, alkylene glycol, polyalkylene glycol, silicone oil or the like. For assuring a desired damping or isolating effect of the engine mount 10 based on the resonance of the fluid, it is desirable that the fluid have a relatively low viscosity, preferably, not higher than 0.1 Pa·s. In order to fill the equilibrium chamber 64, the pressure-receiving chamber 82 and the fluid oscillating chamber 84 with the non-compressible fluid with efficiency, the assembling of the partition member 42, the oscillating rubber plate 44 and the separation-wall member 46 in the second mounting member 14 is effected within a mass of the non-compressible fluid, for example, so that these chambers 64, 82, 84 are effectively filled with the fluid, or alternatively, the non-compressible fluid is poured into and fills these chambers 64, 82, 84 through an inlet hole formed through the second mounting member 14, after the assembling of these members 42, 44, 46 with the second mounting member 14, and then the inlet hole is fluid-tightly closed by means of a suitable cover member such as a blind rivet, so that the all chambers 64, 82, 84 are filled with the fluid.

The engine mount 10 constructed as described above is installed between the power unit and the body of the vehicle such that the first mounting bolt 18 is fixed a member disposed on the side of the power unit, while the second mounting bolt 30 is fixed to a member disposed on the side of the body. With the engine mount 10 installed in position, the port 34 is connected to an external air conduit 100 including a switch valve 102. The oscillating air chamber 78 is alternately connected to a negative pressure source 104 and the atmosphere by a switching operation of the switch valve 102, which operation is desirably controlled by a suitable controller (not shown), whereby the oscillating rubber plate 44 is elastically displaced based on a change of a difference between pressures applied on opposite sides thereof, and its elasticity. This elastic displacement of the oscillating rubber plate 44 induces a periodic pressure change of the fluid in the oscillating fluid chamber 84, causing a pressure difference between the fluid in the oscillating fluid chamber 84 and the fluid in the pressure-receiving chamber 82. Based on this pressure difference, the fluid is forced to flow through the second orifice passage 98 between the oscillating fluid chamber 84 and the pressure-receiving chamber 82, so that the periodic pressure change of the fluid in the oscillating fluid chamber 84 is transmitted to the pressure receiving chamber 82 based on the flow of the fluid through the second orifice passage 98. By controlling the switch valve 102 so as to perform its switching operation at a frequency corresponding to that of the vibration to be damped, the engine mount 10 applies between the power unit and the body a periodic oscillating force which acts to offset or absorb the applied vibration to be damped. In this instance, the engine mount 10 provides an active vibration damping effect by actively adjusting the pressure change of the fluid in the pressure-receiving chamber 82.

In the engine mount 10, the pressure of the fluid in the pressure-receiving chamber 82 is changed due to the elastic deformation of the elastic body 16 upon application of the vibrational load. This pressure change of the fluid in the pressure-receiving chamber 82 induces a pressure difference between the fluid in the pressure receiving chamber 82 and the fluid in the equilibrium chamber 64, causing flows of the fluid flowing through the first orifice passage 96 between the pressure-receiving and equilibrium chambers 82, 64. Therefore, the engine mount 10 may also exhibit a passive vibration damping effect based on resonance of the fluid flowing through the first orifice passage 96. In the present embodiment, the first orifice passage 96 is tuned so as to exhibit a high damping effect with respect to low-frequency vibrations such as engine shakes, on the basis of the resonance of the fluid flowing therethrough, while the second orifice passage 98 is tuned so as to exhibit a high vibration isolating effect with respect to medium-frequency vibrations, such as engine idling vibrations, based on the resonance of the fluid flowing therethrough. In this respect, the first and second orifice passage 96, 98 are suitably arranged so that the flow of the fluid through the first orifice passage 96 does not adversely affect on the vibration isolating effect based on the flow of the fluid through the second orifice passage 98.

According to the engine mount 10 constructed as described above, the oscillating rubber plate 44 is fixedly supported at its central portion by the cylindrical portion 58 of the partition member 42, and is also fixedly supported at its outer peripheral portion by the second mounting member 14. This arrangement is effective to decrease an amount of displacement of the oscillating rubber plate 44 upon application of the periodic air pressure change to the oscillating air chamber 78, leading to decrease in a required axial space for accommodating the oscillating rubber plate 44, whereby the overall size of the engine mount 10 can be made compact.

The decrease in the amount of displacement of the oscillating elastic plate 44 permits a decrease in an amount of negative pressured air statically applied to the oscillating air chamber 78 as a bias, when the oscillating air chamber 78 is alternately connected to the vacuum source and the atmosphere for oscillating the oscillating rubber plate 44. This leads to an improved oscillating response of the oscillating rubber plate 44, resulting in a decrease in a required amount of negative pressure applied to the oscillating air chamber 78 for oscillating the oscillating rubber plate 44.

Further, the first orifice passage 96 is partially formed by the cylindrical portion 58 extending through the central portion of the oscillating rubber plate 44, so that the outer diameter of the oscillating rubber plate 44 can be made larger, in comparison with the conventional engine mount 10 where the orifice passage is disposed radially outwardly of the oscillating rubber plate 44, thereby providing a sufficiently large area of the oscillating rubber plate 44.

The engine mount 10 constructed according to the present embodiment is also arranged such that the fluid pressure change in the oscillating fluid chamber 84 caused by the elastic displacement of the oscillating rubber plate 44 is transmitted to the pressure receiving chamber 82 via flows of the fluid through the second orifice passage 98. Owing to the resonance of the fluid flowing through the second orifice passage 98, the fluid pressure change in the oscillating fluid chamber 84 can be transmitted to the pressure receiving chamber 82 with high efficiency, thereby generating a relatively large oscillating force in the pressure receiving chamber 82 with an excellent energy efficiency.

In addition, the oscillating rubber plate 44 has the tapered cylindrical shape and is disposed so as to be inclined to the axis of the second mounting member 14, in the present engine mount 10, providing a further increased area of the oscillating rubber plate 44.

In the engine mount 10 of the present embodiment, the oscillating air chamber 78 is formed by utilizing the spacing interposed between the oscillating rubber plate 44 and the partition member 42. Thus, the oscillating air chamber 78 is formed with a simple structure and with a reduced member of components.

Moreover, the flexible diaphragm 40, the first partition member 42, the oscillating rubber plate 44 and the separation-wall member 46 are accommodated within the interior space of the second mounting member 14, in the present engine mount 10, whereby the pressure receiving chamber 82, the oscillating air chamber 78 and the equilibrium chamber 64 are formed with simple structure.

Figure 2:
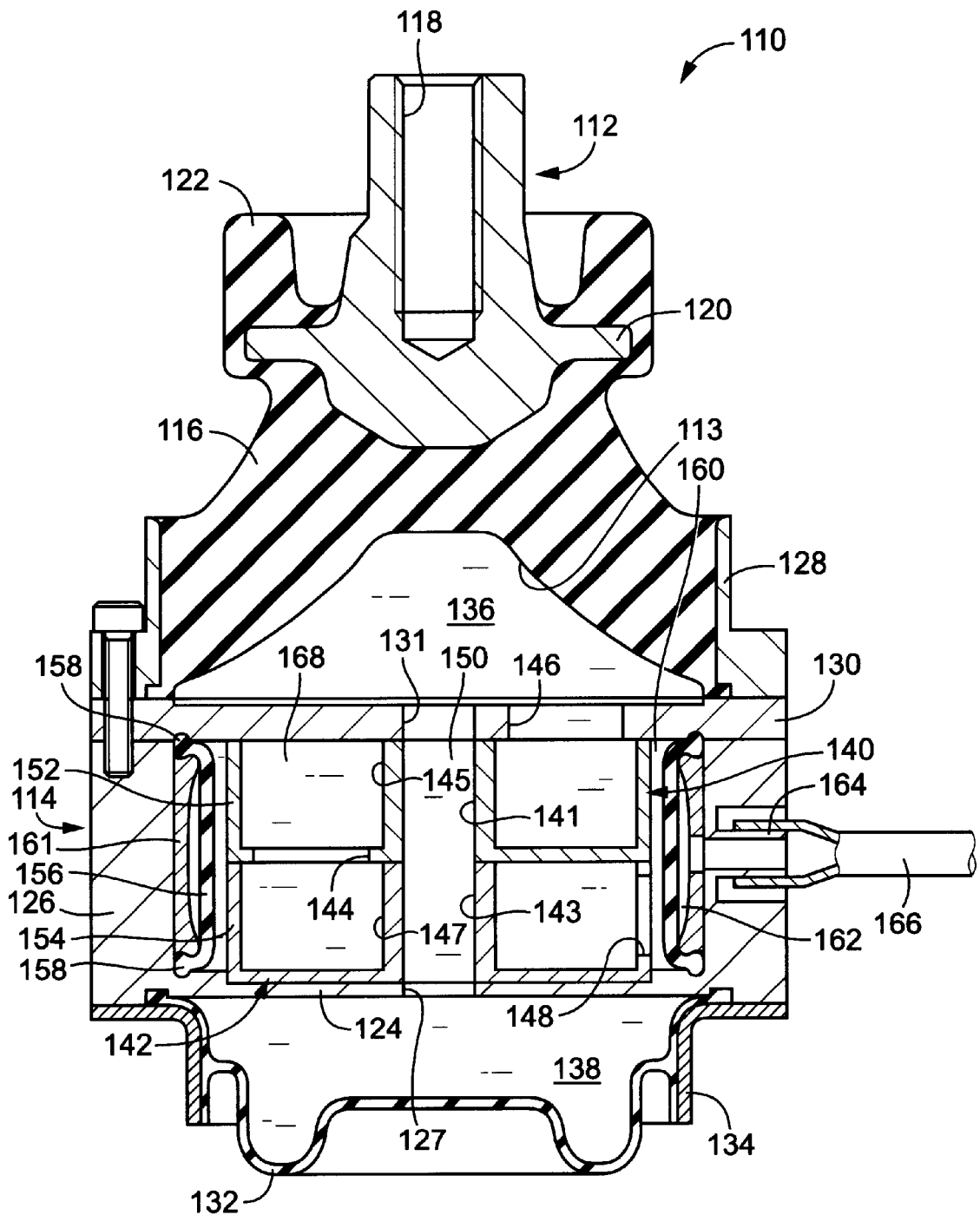
FIG. 2 is an elevational view in axial or vertical cross section of an engine mount constructed according to a second embodiment of the invention.

Referring next to FIG. 2, there is shown an engine mount 110 constructed according to a second embodiment of the present invention. The engine mount 110 includes a first mounting member 112 and a second mounting member 114 which are both metallic materials and which are disposed in mutually opposed and spaced-apart relationship with each other. The first and second mounting members 112, 114 are elastically connected to each other by an elastic body 116 made of a rubber material, likewise the engine mount (10) of the first embodiment. The first and second mounting members 112, 114 are attached to the power unit and the automotive vehicle, respectively, so that the power unit is mounted on the vehicle body in a vibration damping fashion.

The first mounting member 112 has a generally cylindrical rod shaped member including an upper portion and a lower portion whose diameter is larger than that of the upper portion. The first mounting member 112 is positioned such that the center axis of the first mounting member 112 is aligned with the center axis of the engine mount 10. The lower portion has an inverted generally frusto-conical shape, while the upper portion includes a tapped hole 118 formed to receive a screw for attaching the first mounting member 112 to the power unit of the vehicle. The first mounting member 112 further includes an annular stopper 120 integrally formed at its axially intermediate portion so as to extend outwardly in the direction perpendicular to the center axis thereof. On an annular stopper 120 of the first mounting member 112, there is formed a rubber buffer 122 integrally formed with the elastic body 116 such that the rubber buffer 122 extends in the axially upward direction of the elastic body 116.

The elastic body 116 has a generally frusto-conical shape having a relatively large diameter. The elastic body 116 is bonded at its small diameter end face to the first mounting member 112, while being bonded at an outer circumferential surface of its large diameter end portion to a cylindrical connecting sleeve 128 made of metal. Like in the engine mount (10), the elastic body 116 has a recess 113 open in its large-diameter end face.

The second mounting member 114 has a generally hollow cylindrical shape, and includes a thin-walled bottom wall member 124 serving as a first partition wall, and a thick-walled cylindrical wall portion 126 serving as a cylindrical wall portion of the second mounting member. The bottom wall member 124 has a through hole 127 formed through its central portion in the wall thickness direction. The second mounting member 114 is also assembled with a second partition wall in the form of a metallic separation-wall member 130 and a flexible diaphragm 132 which are respectively fixed to the axially opposite end portion of the second mounting member 114. In this embodiment, the bottom wall member 124 and the separation-wall member 130 constitute a partition stricture.

The separation-wall member 130 has a generally disk-shaped member an outer peripheral portion of which is supported by and between the connecting sleeve 128 and the second mounting member 114. The second mounting member 114 and the connecting sleeve 128 are bolted together so that the outer peripheral portion of the spacing plate 130 is fluid-tightly fixed to and compressed between the connecting sleeve 128 and the second mounting member 114. The separation-wall member 130 has a through hole 131 formed through its central portion.

The flexible diaphragm 132 is a thin-walled rubber layer having a slack at its central portion so as to facilitate its deformation. The flexible diaphragm 132 is bonded at its peripheral portion to an inner circumferential surface of a fixing member 134 upon vulcanization of a rubber material for forming the flexible diaphragm 132. The fixing member 134 is a generally annular member extending in its circumferential direction with a constant inverted "L" shaped cross sectional configuration. The fixing member 134 is superposed at its annular upper end face onto the bottom surface of the second mounting member 114, and bolted to the second mounting member 114, whereby the axially lower open end of the second mounting member 114 is fluid-tightly closed by the flexible diaphragm 132.

With the above-indicated components 112, 116, 128, 130, 114, 124, 134 assembled together as described above, the separation-wall member 130 cooperates with the elastic body 116 to defined therebetween a pressure receiving chamber 136, while the bottom wall member 124 cooperates with the flexible diaphragm 132 to define therebetween an equilibrium chamber whose volume is variable due to the deformation of the flexible diaphragm 132. The pressure receiving and equilibrium chambers 136, 138 are both filled with the non-compressible fluid, likewise the engine mount (10) of the first embodiment.

Within an axially intermediate hollow space of the second mounting member 114 interposed between the bottom wall member 124 and the separation-wall member 130, there are accommodated an upper groove member 140 and a lower groove member 142 which have a thick-walled disk-like shape and which are laminated on each other. The upper and lower groove members 140, 142 serve as an orifice-defining member. The upper and lower groove members 140, 142 have respective central through holes 141, 143 which are formed through central portions of the respective groove members 140, 142. The upper and lower groove members 140, 142 have also respective grooves 145, 147 open in respective axially upper end faces thereof and extending continuously in their circumferential directions with a circumferential length substantially equal to or slightly smaller than a circumference thereof. The central through holes 141, 143 of the upper and lower groove members 140, 142 are connected in series with each other in their axial directions. The axially upper open end of the through hole 141 is connected to the through hole 131 of the separation-wall member 130, while the axially lower open end of the through hole 143 is connected to the through hole 127, whereby the central through holes 141, 143 and the through holes 131, 127 cooperate to define a first orifice passage 150 for fluid communication between the pressure receiving chamber 136 and the equilibrium chamber 138.

Namely, the upper and lower groove members 140, 142 are fluid-tightly superposed on each other in the axial direction, interposed between the bottom wall member 124 and the separation-wall member 130. In this condition, the outer circumferential surfaces 152, 154 of the upper and lower groove members 140, 142 are opposed to the inner circumferential surface of the cylindrical wall portion 126 of the second mounting member 114 in the radial direction with a given spacing therebetween. This given spacing has a cylindrical configuration extending continuously in the circumferential direction, and is adapted to accommodate a cylindrical oscillating rubber plate 156. Axially opposite open-end portion of the oscillating rubber plate 156 are bent in the radially outward direction to thereby provide a pair of annular grip portions 158, 158 as integral parts. The cylindrical oscillating rubber plate 156 is fluid-tightly pressed at its axially upper and lower annular grip portions 158, 158 onto the separation-wall member 130 and the bottom wall member 124, respectively, by means of a fixing sleeve 161 which is forcedly fixed into the cylindrical wall portion 126 of the second mounting member 114. That is, the cylindrical rubber plate 156 fluid-tightly divides the above-indicated spacing formed between the outer circumferential surfaces 152, 154 and the inner circumferential surface of the cylindrical wall portion 126, into an oscillating fluid chamber 160 filled with the non-compressible fluid and formed on the radially inner side of the oscillating rubber plate 156, and an oscillating air chamber 162 formed on the radially outer side of the rubber plate 156 and separated from the external area. A port 164 is formed through the cylindrical wall portion 126 and the fixing sleeve 161 of the second mounting member 114, so that the oscillating air chamber 162 is held in communication with the external area through the port 164. In the operation the engine mount 110, an air conduit 166 including a switch valve is connected to the port 164 so that the oscillating air chamber 162 is alternately connected to a suitable vacuum source and the atmosphere by a switching operation of the switch valve of the air conduit 166, like the first embodiment.

With respect to the upper and lower groove members 140, 142, the opening of the groove 147 of the lower groove member 142 is fluid-tightly closed by the bottom wall of the upper groove member 140 superposed thereon, while the opening of the groove 145 of the lower groove member 140 is fluid-tightly closed by the separating-wall member 130 superposed thereon. These grooves 145 and 147 are communicated with each other through a communication hole 144 formed through the bottom wall of the upper groove member 140, and the groove 145 is held in fluid communication with the pressure receiving chamber 136 through the communication hole 146 formed through the separation-wall member 130, while the lower groove 147 is held in fluid communication with the oscillating fluid chamber 160 through a communication hole 148 formed through the outer circumferential wall portion 154 of the lower groove member 142. Thus, there is formed a second orifice passage 168 for fluid communication between the pressure receiving chamber 136 and the oscillating fluid chamber 160.

That is, the second orifice passage 168 is completely independent of the first orifice passage 150. Namely, the first orifice passage 150 extends straightly along with the center axis of the engine mount 110, while the second orifice passage 168 extends about the first orifice passage 150 with a circumferential length which is larger than a circumference of the upper or the lower groove member 140, 142.

The engine mount 110 constructed according to the second embodiment of the present invention is installed between the power unit and the body of the vehicle such that the first mounting member 112 is fixed to a member disposed on the side of the power unit, while the second mounting member 114 is fixed to a member disposed on the side of the body. Like the first embodiment, the engine mount 110 installed in position, exhibits a high passive damping effect with respect to low frequency vibrations such as engine shakes, based on the resonance of the fluid flowing through the first orifice passage 150 between the pressure receiving chamber 136 and the equilibrium chamber 138. Further, a suitable periodic air pressure change is applied to the oscillating air chamber 162 at a frequency corresponding to the frequency of the vibration to be damped, so that the oscillating plate 156 is oscillated at the frequency corresponding to the vibration to be damped. This oscillation of the oscillating plate 156 causes a periodic pressure change of fluid in the oscillating fluid chamber 160. The fluid pressure change actively induced in the oscillating fluid chamber 160 is transmitted to the pressure-receiving chamber 136 via the flow of the fluid through the second orifice passage 168. The engine mount 110 exhibits a high vibration isolating effect with respect to medium- or high-frequency vibrations, such as engine idling vibrations, based on the resonance of the fluid flowing through the second orifice passage 168.

In the engine mount 110, the oscillating rubber plate 156 has the cylindrical configuration and is disposed in a radially outermost portion of the interior space of the engine mount 110, making it possible to provide a sufficiently large area of the oscillating rubber plate 156 with efficiency, while restricting undesirable enlargement of the outer diameter of the engine mount 110, thereby permitting a reduced size of the engine mount 110 and an improved oscillating response of the oscillating rubber plate 156, likewise the engine mount 10 of the first embodiment.

In particular, the use of the cylindrical oscillating rubber plate 156 in the engine mount 110 makes it possible to provide a relatively large space in a radially inward portion of the oscillating rubber plate 156, thereby permitting a formation of a spirally extending second orifice passage, or a formation of a second orifice passage with a sufficiently large cross sectional area thereof and a sufficiently large length thereof. This arrangement results in a high degree of freedom in tuning of the second orifice member and the vibration damping characteristics of the engine mount 110.

While the presently preferred embodiment of this invention has been described above in detail for the illustrative purpose only, it is to be understood that the present invention is not limited to the details of the illustrated embodiments, but may be otherwise embodied.

For instance, the first orifice passage is formed so as to extend straightly along with the center axis of the engine mount in the first and second embodiment. However, the configuration or structure of the first orifice passage is not limited to the illustrated embodiment, but may otherwise be modified, taking into account required vibration damping characteristics of a vibration damping device.

Figure 3:
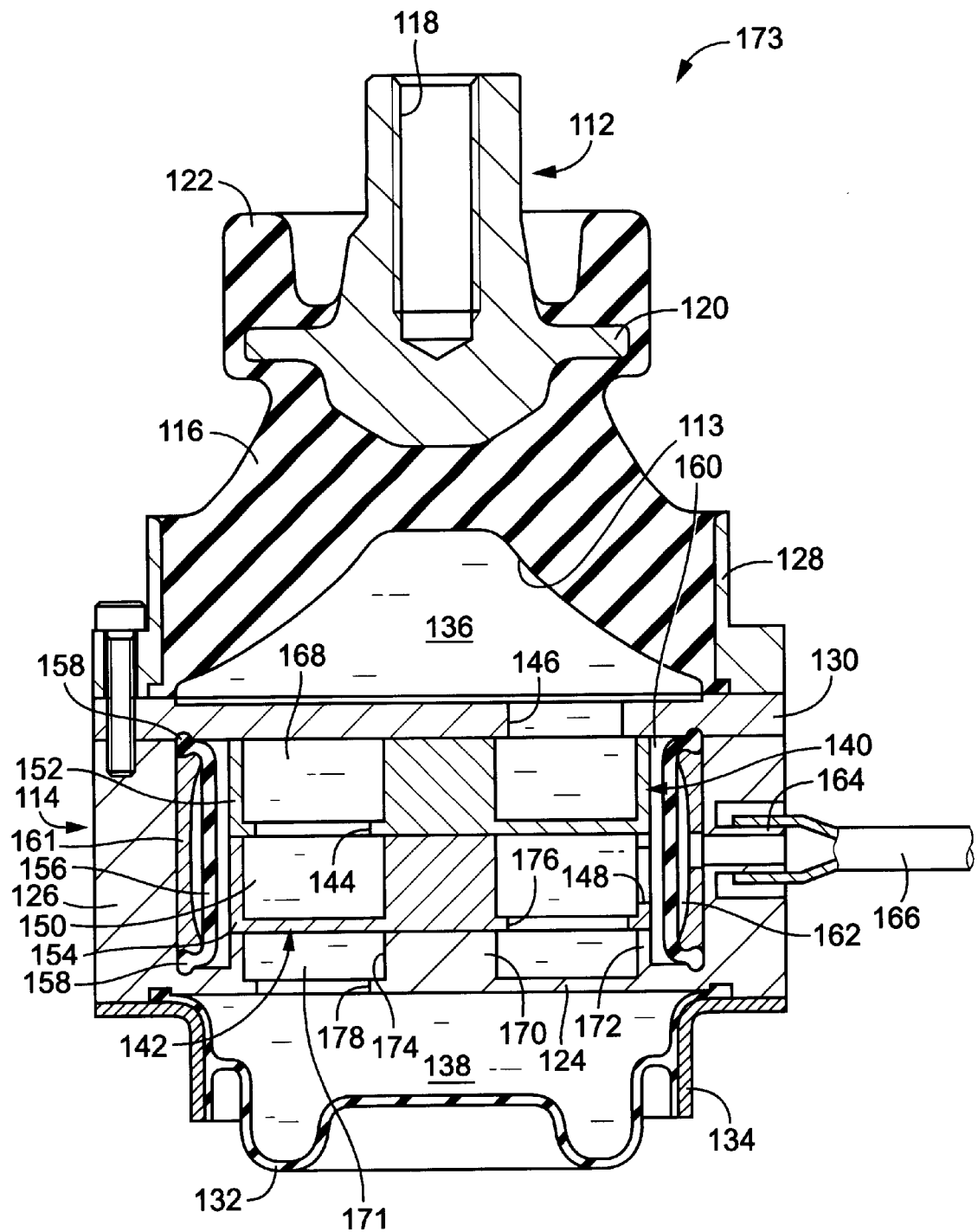
FIG. 3 is an elevational view in axial or vertical cross section of an engine mount constructed according to a third embodiment of the invention.

Referring next to FIG. 3, an engine mount 173 constructed according to a third embodiment of the present invention is depicted, which includes a modified orifice structure. Described in detail, the central through holes (141, 143) and the upper and lower through holes (131, 127) need not to be formed in the engine mount 173. One end of the second orifice passage 168, which is connected to the oscillating fluid chamber 160, is arranged to have a branched passage extending so as to communicate with the equilibrium chamber 138 instead, thereby providing a first orifice passage 171 for fluid communication between the pressure receiving chamber 136 and the equilibrium chamber 138. That is, the first orifice passage 171 is formed by utilizing the second orifice passage 168.

As is apparent from the FIG. 3, the engine mount 173 constructed according to the third embodiment of the invention has the bottom wall member 124 which is arranged to further include a central circular projection 170 and an outer circumferential cylindrical projection 172 which are integrally formed at a central portion and an outer peripheral portion of the upper end face of the bottom wall member 124. These projections 170, 172 cooperate to each other to define therebetween a circumferential groove 174 open in the protruding end face of these projections 170, 172, and extending in its circumferential direction with a circumferential length that is substantially equal to and smaller than the circumference of the bottom wall member 124. The opening of the circumferential groove 174 is fluid tightly closed by the lower groove member 142 superposed thereon, thereby providing a substantially annular fluid passage one end of which is held in communication with the equilibrium chamber 138 through a communication hole 178 formed through the bottom wall member 124, while the other end of which is held in communication with the second orifice passage 168 through the communication hole 176. Thus, the annular fluid passage defined by the circumferential groove 174 cooperate to the second orifice passage 168 to provide a first orifice passage 171 for fluid communication between the pressure receiving chamber 136 and the equilibrium chamber 138.

In the engine mount 173 of the third embodiment, the first orifice passage 171 is held in fluid communication in series with the second orifice passage 168. Therefore, flows of the fluid through the first orifice passage 171 between the pressure receiving chamber 136 and the equilibrium chamber 138 are effected via flows of the fluid through the second orifice passage 168. In this respect, the second orifice passage 168 is tuned to a frequency band higher than a frequency band to which the first orifice passage 171 is tuned, so that the engine mount 173 exhibits a high damping effect with respect to low frequency vibration based on the flow of the fluid through the first orifice passage 171, without suffering from resistance to flow of the fluid through the second orifice passage 168. Upon application of medium- or high- frequency vibrations, a resistance to flow of the fluid through the first orifice passage 171 is significantly increased, whereby the engine mount 171 exhibits a high active vibration isolating effect with respect to the medium- or high- frequency vibrations, based on the flows of the fluid through the second orifice passage 168, without adverse effect of the provision of the first orifice passage 171.

Accordingly, the engine mount 173 of the third embodiment may enjoy the same advantages of the present invention as discussed above with respect to the engine mount 110 constructed according to the second embodiment. In particularly, the engine mount 173 makes it possible to have a relatively large length of the first orifice passage, resulting in an increased degree of freedom in tuning the first orifice passage 171.

In the engine mount 173, the first orifice passage 171 may be modified to be constituted by two or more groove parts which are superposed on each other in the axial direction of the mount 173. This arrangement makes it possible to further increase the length of the first orifice passage 171.

It is noted that the second orifice passage 98, 168 and the second partition member 46, 130 are not essential to practice the present invention. In this case, the elastic body 16, 116 and the oscillating rubber plate 44, 156 cooperate to define therebetween a single pressure receiving chamber, so that the oscillating rubber plate 44, 156 is oscillated so as to directly control the fluid pressure in the pressure-receiving chamber, for exhibiting an active vibration damping effect of the engine mount.

The operation of the switch valve 102 may be controlled by various known control units or devices. For instance, the operation of the switch valve 102 is controlled in a known adaptive control fashion or according to a stored data map, on the basis of an output signal representing vibrations such as an engine ignition signal, an engine speed signal, a shift lever position signal, a running speed signal, or the like.

Where the straightly extending first orifice passage 96 is employed, the cylindrical portion 58 may protrude toward the equilibrium chamber 64, or alternatively an additional hollow cylindrical member may be fixed to the central portion of the upper end face of the second partition wall member 46, in order to further increase the length of the first orifice passage 96.

In the above-described preferred embodiments of the invention, the present invention is applied to an engine mount for an automotive vehicle. The present invention is suitably applicable to the other mounts for the vehicle, such as a body mount, a cab mount, and a fluid-filled elastic mount or a damper used for various kinds of devices other than those used for the vehicle.

It is to be understood that the present invention may be embodied with various other changes, modifications, and improvement which may occur to those skilled in the art, without departing from the spirit and scope of the invention defined in the following claims:

What is claimed is:

1. A fluid-filled vibration damping device comprising:
    a first and a second mounting member which are spaced apart from each other;
    an elastic body elastically connecting said first and second mounting members and partially defining a primary fluid chamber filled with a non-compressible fluid;
    a flexible diaphragm partially defining an auxiliary fluid chamber filled with the non-compressible fluid and whose volume is variable;
    a first partition wall fixed to said second mounting member and disposed between said primary fluid chamber and said auxiliary fluid chamber;
    a first orifice passage formed at a central portion of said first partition wall for fluid communication between said primary and auxiliary fluid chamber; and
    an elastic oscillating plate having an annular or a cylindrical shape and disposed radially outwardly of said orifice passage so as to continuously extend in a circumferential direction thereof, said elastic oscillating plate partially defining said primary fluid chamber on one of opposite sides thereof and an oscillating air chamber on the other side thereof,
    said oscillating air chamber being applied with periodic change of an air pressure so as to apply to said elastic oscillating plate an oscillating force whose frequency is corresponding to that of vibrations to be damped, whereby said vibration damping device exhibits an active damping effect with respect to said vibrations to be damped.

2. A fluid-filled vibration damping device according to claim 1, wherein said second mounting member includes a cylindrical wall portion one of axially opposite open ends of which is opposed to said first mounting member with a spacing therebetween, said elastic body elastically connects said first mounting member with said one of axially opposite open ends of said cylindrical wall portion of said second mounting member such that said one of axially opposite open ends of said cylindrical wall portion of said second mounting member is fluid-tightly closed by said elastic body, said flexible diaphragm fluid tightly closes the other open end of said cylindrical wall portion of said second mounting member, and said first partition wall is supported by and disposed within said cylindrical wall portion of said second mounting member and cooperates with said flexible diaphragm to define therebetween said auxiliary fluid chamber, said vibration damping device further comprising a central tube member fixedly disposed through said first partition wall so as to extend straightly substantially in a center axis of said first partition wall over said primary and auxiliary fluid chambers, said central tube member having a bore serving as said first orifice passage, said elastic oscillating plate having a generally annular shape and being fixedly supported at an inner peripheral portion thereof by said central tube member onto which said inner peripheral portion of said elastic oscillating plate is press-fitted, and while being fixedly supported at an outer peripheral portion thereof by said cylindrical wall portion of said second mounting member, said elastic oscillating plate and said first partition wall being opposed to each other with a spacing therebetween to define therebetween said oscillating air chamber.

3. A fluid-filled vibration damping device according to claim 2, wherein said elastic oscillating plate has a tapered cylindrical shape and disposed radially outwardly of said central tube member so that said elastic oscillating plate cooperates with said first partition wall to define therebetween an annular void disposed radially outwardly of said central tube member and extending in a circumferential direction thereof while being open in a circumferential surface thereof, said opening of said annular void being fluid-tightly closed by said cylindrical wall portion of said second mounting member, to thereby define said oscillating air chamber interposed between said elastic oscillating plate and said first partition wall.

4. A fluid-filled vibration damping device according to claim 1, wherein said second mounting member includes a cylindrical wall portion one of axially opposite open ends of which is opposed to said first mounting member with a spacing therebetween, said elastic body elastically connects said first mounting member with said one of said axially opposite open ends of said cylindrical wall portion of said second mounting member such that said one of said axially opposite open ends of said cylindrical wall portion of said second mounting member is fluid-tightly closed by said elastic body, said flexible diaphragm fluid tightly closed the other open end of said cylindrical wall portion of said second mounting member, and said first partition wall is supported by and disposed within said cylindrical wall portion of said second mounting member, said first partition wall partially defining said primary fluid chamber on one of opposite side thereof and said auxiliary fluid chamber on the other side thereof, said elastic oscillating plate having a generally cylindrical shape and disposed within said primary fluid chamber such that axially opposite end portions of said elastic oscillating plate are supported by respective axial portions of said cylindrical wall portion of said second mounting member, said elastic oscillating plate partially defining said primary fluid chamber on an inner circumferential side thereof and cooperating with said cylindrical wall portion of said second mounting member to define therebetween said oscillating air chamber on an outer circumferential side thereof.

5. A fluid-filled vibration damping device according to claim 4, wherein said first orifice passage extends annularly or helically in said circumferential direction of said first partition wall.

6. A fluid-filled vibration damping device according to claim 1, further comprising a second partition wall fixed to and supported by said second mounting member, such that said second partition member divides said primary fluid chamber into a pressure receiving chamber partially defined by said elastic body and filled with said non-compressible fluid a pressure of which changes due to an elastic deformation of said elastic body, and an oscillating fluid chamber partially defined by said elastic oscillating plate and filled with said non-compressible fluid a pressure of which changes due to displacement of said elastic oscillating plate, and a second orifice passage for fluid communication between said pressure receiving chamber and said oscillating fluid chamber.

7. A fluid-filled vibration damping device according to claim 6, wherein said first and second partition walls are superposed on each other and cooperate to define at central portions thereof said first orifice passage.

8. A fluid-filled vibration damping device according to claim 6, wherein said elastic oscillating plate having an annular plate-like shape and interposed between outer circumferential portion of said first and second partition walls which are superposed on each other, said elastic oscillating plate cooperating with said first partition plate to define therebetween said oscillating air chamber, and cooperating with said second partition plate to define therebetween said oscillating fluid chamber.

9. A fluid-filled vibration damping device according to claim 6, wherein said first orifice passage is formed through said first and second partition wall such that said first orifice passage extends straightly in the center axes of said first and second partition walls, and said second orifice passage is disposed radially outwardly of said first orifice passage so as to extend in a circumferential direction.

10. A fluid-filled vibration damping device according to claim 6, wherein said second orifice passage is formed in a radially intermediate portion of said second partition member so as to extend in a circumferential direction of said second partition member, and one of opposite ends of said second orifice passage, which end is connected to said oscillating fluid chamber, further extends so as to be connected with said auxiliary fluid chamber, so that said first orifice passage is formed by partially utilizing said second orifice passage.

11. A fluid-filled vibration damping device according to claim 6, wherein one of said first and second mounting members is attached to a power unit of an automotive vehicle and the other of said first and second mounting members is attached to a body of the automotive vehicle, said first and second orifice passages being tuned to a low frequency band corresponding to a vibration of engine shakes and an medium frequency band corresponding to a vibration of engine idling.

12. A fluid-filled vibration damping device according to claim 1, wherein one of said first and second mounting members is attached to a power unit of an automotive vehicle and the other of said first and second mounting members is attached to a body of the automotive vehicle, and said oscillating air chamber is alternately connectable to a negative pressure source of an engine of said vehicle and the atmosphere.

13. A fluid-filled vibration damping device according to claim 1, wherein said vibration damping device elastically connects said two members of said vibration system, or elastically mount one of said two members on the other members such that said first mounting member is fixed to one of said two members in said vibration system, while said second mounting member is fixed to the other member in said vibration system.

14. A fluid-filled vibration damping device according to claim 1, wherein one of said first and second mounting members is fixed to a vibrative member whose vibration to be damped, and the other of said first and second mounting members is connected to said vibrative member via said elastic body, said the other of said first and second mounting members cooperating with said elastic body to constitute a secondary vibration system.

15. A fluid-filled vibration damping device according to claim 1, wherein said first partition wall partially defines said auxiliary fluid chamber.

16. A fluid-filled vibration damping device comprising:
   a first mounting member and a second mounting member including a cylindrical portion, which are spaced apart from each other such that one of axially opposite open ends of said cylindrical portion of said second mounting member is opposed to said first mounting member;
   an elastic body elastically connecting said first and second mounting member such that said one of axially opposite open ends of said cylindrical portion of said second mounting member is fluid-tightly closed by said elastic body;
   a flexible diaphragm fluid-tightly closing the other open end of said cylindrical portion of said second mounting member;
   a partition structure supported by said cylindrical portion of said second mounting member such that said partition structure fluid-tightly divides an interior space of said cylindrical portion of said second mounting member into a pressure receiving chamber partially defined by said elastic body and disposed on one of axially opposite sides thereof and an equilibrium chamber partially defined by said flexible diaphragm and disposed on the other side thereof, said pressure receiving and equilibrium chambers being filled with a non-compressible fluid; and
   a tapered cylindrical elastic oscillating plate which is fixed at a small-diameter open end portion thereof to a diametrically central portion of said partition structure, and which is fixed at a large-diameter open end portion thereof to said cylindrical portion of said second mounting member, said elastic oscillating plate partially defining at an inner circumferential surface thereof an oscillating fluid chamber filled with said non-compressible fluid and at an outer circumferential surface thereof an oscillating air chamber, said partition structure having a first orifice passage formed in said diametrically central portion thereof so as to extend therethrough in an axial direction thereof for fluid communication between said pressure receiving chamber and said equilibrium chamber, and a second orifice passage formed in an outer circumferential portion thereof so as to extend in a circumferential direction thereof for fluid communication between said pressure receiving chamber and said oscillating fluid chamber, said first orifice passage disposed radially inwardly of said small-diameter open end portion of said elastic oscillating plate, said oscillating air chamber being applied with a periodic change of an air pressure so as to apply to said elastic oscillating plate an oscillating force whose frequency is corresponding to that of vibrations to be damped, whereby said vibration damping device exhibits an active damping effect with respect to said vibrations to be damped.

17. A fluid-filled vibration damping device comprising:

a first mounting member and a second mounting member including a cylindrical portion, which are spaced apart from each other such that one of axially opposite open ends of said cylindrical portion of said second mounting member is opposed to said first mounting member;

an elastic body elastically connecting said first and second mounting member such that said one of axially opposite open ends of said cylindrical portion of said second mounting member is fluid-tightly closed by said elastic body;

a flexible diaphragm fluid-tightly closing the other open end of said cylindrical portion of said second mounting member;

a partition structure including a first and a second partition walls which are fixed at said cylindrical portion of said second mounting member such that said first and second mounting member are spaced apart from each other in an axial direction of said cylindrical portion of said second mounting member, said first partition wall cooperates with said flexible diaphragm to define therebetween an equilibrium chamber filled with a non-compressible fluid and whose volume is variable, and said second partition wall cooperates with said elastic body to define therebetween a pressure receiving chamber filled with said non-compressible fluid;

an orifice defining member interposed between said first and second partition wall in said axial direction for defining a first orifice passage at a central portion thereof so as to extend therethrough in an axial direction thereof, and a second orifice passage at an outer circumferential portion thereof so as to extend in a circumferential direction thereof, said orifice defining member having an outer diameter smaller than an inner diameter of said cylindrical portion of said second mounting member so as to define therebetween an annular space; and a generally cylindrical elastic oscillating plate disposed in said annular space and fixed at axially opposite end portions thereof to said cylindrical portion of said second mounting member such that said elastic oscillating plate cooperate with said outer cylindrical portion of said second mounting member to partially define therebetween an oscillating air chamber and cooperate with an outer circumferential surface of said orifice defining mean to partially define therebetween an oscillating fluid chamber filled with said non-compressible fluid, said first orifice passage communicate at opposite ends thereof with said pressure receiving chamber and said equilibrium chamber, respectively, said second orifice passage communicate at opposite ends thereof with said pressure receiving chamber and said oscillating fluid chamber, respectively, said oscillating air chamber being applied with a periodic change of an air pressure so as to apply to said elastic oscillating plate an oscillating force whose frequency is corresponding to that of vibrations to be damped, whereby said vibration damping device exhibits an active damping effect with respect to said vibrations to be damped.

* * * * *